United States Patent
Gottlieb et al.

(10) Patent No.: US 11,794,132 B2
(45) Date of Patent: Oct. 24, 2023

(54) DIGITAL TREATMENT OF MULTI-PHASE LIQUID MIXTURES

(71) Applicant: Schlumberger Technology Corporation, Sugar Land, TX (US)

(72) Inventors: Emanuel J. Gottlieb, Upper St. Clair, PA (US); Gary W. Sams, Houston, TX (US)

(73) Assignee: CAMERON INTERNATIONAL CORPORATION, Houston, TX (US)

(*) Notice: Subject to any disclaimer, the term of this patent is extended or adjusted under 35 U.S.C. 154(b) by 4 days.

(21) Appl. No.: 16/515,335

(22) Filed: Jul. 18, 2019

(65) Prior Publication Data

US 2021/0016205 A1 Jan. 21, 2021

(51) Int. Cl.
| | |
|---|---|
| *B01D 17/12* | (2006.01) |
| *G05D 21/00* | (2006.01) |
| *B01D 17/04* | (2006.01) |

(52) U.S. Cl.
CPC .......... *B01D 17/12* (2013.01); *B01D 17/04* (2013.01); *G05D 21/00* (2013.01)

(58) Field of Classification Search
None
See application file for complete search history.

(56) References Cited

U.S. PATENT DOCUMENTS

| | | | |
|---|---|---|---|
| 4,320,659 A | 3/1982 | Lynnworth et al. | |
| 7,049,831 B2 | 5/2006 | Wooton et al. | |
| 7,078,910 B2 | 7/2006 | Hirthe et al. | |
| 7,621,181 B2 | 11/2009 | Cammarata et al. | |
| 8,794,449 B2 | 8/2014 | Micke et al. | |
| 2001/0050248 A1 | 12/2001 | Larkner et al. | |
| 2003/0062324 A1 | 4/2003 | Abrams et al. | |
| 2004/0020860 A1 | 2/2004 | Schmigel et al. | |
| 2005/0018176 A1* | 1/2005 | Smith ................ | G01N 33/2823 356/128 |
| 2008/0156649 A1* | 7/2008 | Sams ..................... | B01D 17/06 204/554 |
| 2012/0285896 A1 | 11/2012 | Black | |
| 2013/0327646 A1* | 12/2013 | Sams ..................... | B01D 17/06 204/573 |
| 2013/0334142 A1* | 12/2013 | Janjua ................ | B01D 17/0214 210/708 |
| 2014/0090454 A1 | 4/2014 | Surman et al. | |
| 2018/0119031 A1* | 5/2018 | Haworth ............ | B01D 11/0484 |
| 2019/0022565 A1 | 1/2019 | Dabirian et al. | |

FOREIGN PATENT DOCUMENTS

EP    0937231 A1    8/1999

OTHER PUBLICATIONS

International Search report and written opinion issued in the PCT application PCT/US2020/041582, dated Nov. 4, 2020 (10 pages).

* cited by examiner

*Primary Examiner* — Richard C Gurtowski
(74) *Attorney, Agent, or Firm* — Jeffrey D. Frantz (57) ABSTRACT

A method of operating a liquid separator includes detecting a volume of a multi-phase liquid mixture inside the operating liquid separator using one or more detectors; determining, from a signal of the one or more detectors, a volume of the multi-phase liquid mixture; determining an amount of a chemical treatment, or other operating parameter, based on the volume of the multi-phase liquid mixture; and applying the amount of chemical treatment, or other operating parameter, to the separator.

9 Claims, 4 Drawing Sheets

DIGITAL TREATMENT OF MULTI-PHASE LIQUID MIXTURES

FIELD

Embodiments herein generally relate to liquids separation. Specifically, methods and apparatus for automated chemical treatment in liquids separation facilities are disclosed.

BACKGROUND

Oil/water separation is common in the hydrocarbon industry. In hydrocarbon recovery operations, water is commonly used to carry solids and liquids into and out of equipment and reservoirs for various purposes. The water frequently comes into contact with hydrocarbons such as oil and can become intermingled with the hydrocarbon. When the operation is finished, water with hydrocarbon cannot be discharged to the environment without first removing the hydrocarbon.

Separations are typically performed to remove the hydrocarbon from the water. As is commonly known, oil typically separates from water spontaneously by gravity. In the hydrocarbon production context, however, the oil/water mixture typically includes other materials that result in formation of stable or semi-stable emulsions of oil and water when the fluid is agitated or sheared, for example during pumping or other transportation. Most specifications for stabilized crude oil require basic sediment and water (BS&D) content less than 1% by volume. Emulsions can grow to 25% by volume during crude processing. Rejecting the emulsion to achieve the specification results in loss of oil and need for separating the oil from the water before returning the water to the environment.

Many processes for mitigating emulsion during oil/water separation are known. One such process is to add demulsifying agents to the oil/water mixture. In most cases an excess of demulsifying agents is used at substantial cost, chiefly because the amount of emulsion in the fluid at the time of processing is unknown. There is a need in the art for methods and apparatus to automatically control chemical abatement of emulsions in hydrocarbon recovery operations.

SUMMARY

Embodiments described herein provide a multi-phase liquid separation control system, comprising an internal liquid mixture volume detector; a chemical treatment system; and a controller coupled to the internal liquid mixture volume detector and the chemical treatment system and configured to receive a signal from the internal liquid mixture volume detector representing a volume of a liquid mixture and to control an operating parameter based on the signal.

Other embodiments described herein provide a separator, comprising a vessel; an internal liquid mixture volume detector coupled to the vessel; a chemical treatment apparatus coupled to the vessel; and a controller coupled to the internal liquid mixture volume detector and the chemical treatment apparatus and configured to receive a signal from the internal liquid mixture volume detector representing a volume of a separable liquids mixture in the vessel and to control an operating parameter of the separator based on the signal.

Other embodiments described herein provide a method, comprising detecting a volume of a multi-phase liquid mixture inside an operating liquids separator using one or more detectors; determining, from a signal of the one or more detectors, a volume of the multi-phase liquid mixture; determining one or more operating targets of the separator based on the volume of the multi-phase liquid mixture; and applying the one or more operating targets to the separator.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
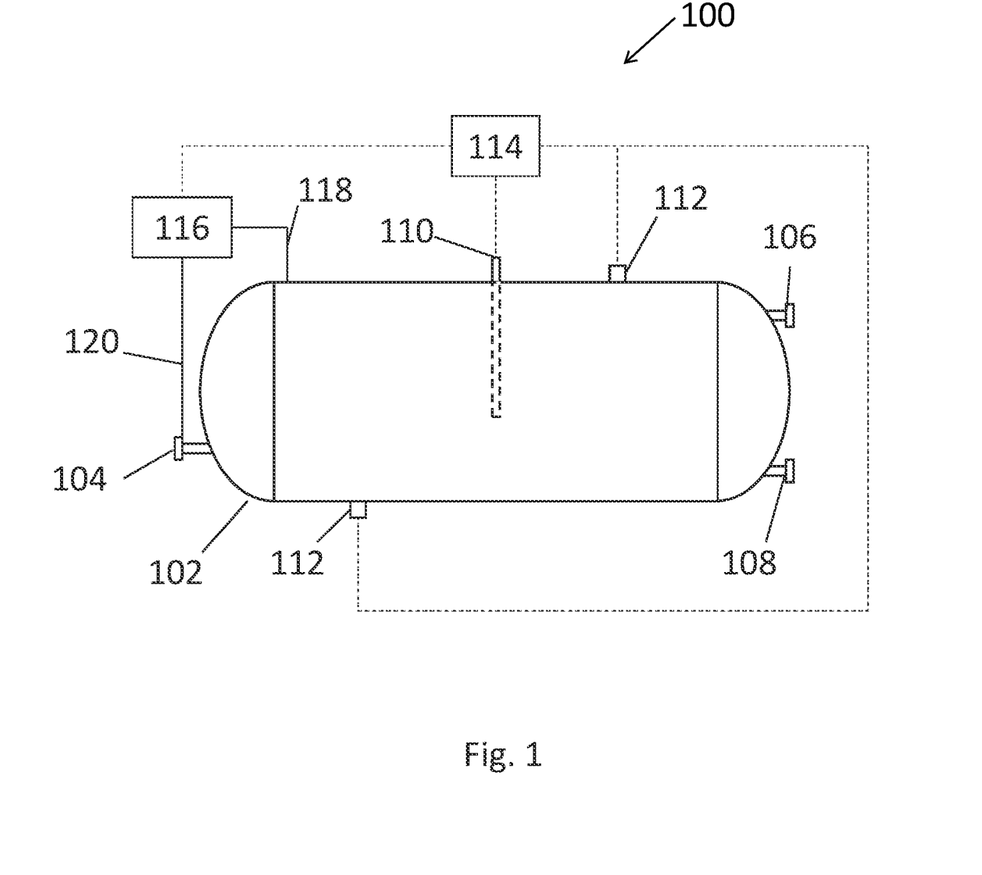
FIG. 1 is a schematic view of a separation apparatus according to one embodiment.

FIG. 1 is a schematic view of a separation apparatus 100 according to one embodiment. The separation apparatus 100 features a vessel 102 in which the separation is performed, an inlet 104 to the vessel 102 through which a separable fluid mixture is provided to the vessel 102, a first outlet 106 through which a first phase of the separable fluid mixture is extracted from the vessel 102, and a second outlet 108 through which a second phase of the separable fluid mixture is extracted from the vessel 102. Any number of inlets and outlets may be provided, depending on the number of streams charged to, and removed from, the vessel 102. The separable fluid mixture is provided to the vessel 102 through the inlet 104, and the separable fluid mixture separates into two or more phases inside the vessel 102, with a first phase being extracted through the first outlet 106 and a second phase being extracted through the second outlet 108.

A separation accelerator 110 may be coupled to the vessel 102 to increase separation efficiency and throughput through the vessel 102. The separation accelerator 110 may be an electric applicator with electrodes that extend into the separable fluid mixture in the vessel 102 and power circuits coupled to the electrodes. The separation accelerator 110 may also be, or include, a thermal separation accelerator to apply heat to the separable fluid mixture to decrease viscosity of the mixture, or a sonic separation accelerator. The separation accelerator 110 generally applies energy to a separable liquids mixture in the vessel 102 to increase separation efficiency in the vessel 102.

The separator apparatus 100 includes an internal mixture volume detector 112 coupled to the vessel 102. The mixture volume detector 112 detects a volume of durable phase mixture in the vessel 102 and outputs a signal representing the volume of the durable phase mixture in the vessel 102. A controller 114 is operatively coupled to the mixture volume detector 112 to receive the signal representing the mixture volume. The mixture volume detector 112 may be a nuclear detector, an RF detector, an ultrasonic detector, a wave guided radar detector, a differential pressure detector, or a thermal detector. The nuclear, RF, ultrasonic, and radar detectors all detect phase boundaries based on differential impedance of different phases in the vessel 102. The vessel typically has two continuous liquid phases, and a phase transition region may have a mixture phase representing a durable mixture of the two liquid phases, for example an emulsion. Such detectors can be arranged to detect the various phase boundaries in the vessel 102, particularly the boundaries between the mixture phase and the other continuous liquid phases, compute a difference in elevation of the boundaries, and determine a volume of emulsion in the vessel 102 based on the boundary readings. The differential pressure detector detects differences in density from the different phases in the vessel 102. The thermal detector detects differences in thermal conductivity from the different phases in the vessel 102. Any or all such detectors can be used, alone or in combination, to resolve a signal representing the volume of mixture in the vessel 102 and send that signal to the controller 114.

The mixture volume detector 112 may include a plurality of detectors of different types to increase the precision of measurements of mixture volume in the vessel 102. For example, depending on the flow characteristics of the vessel 102, the mixture may have a substantially constant thickness at all areas of the vessel 102, or the mixture may have a thickness that is different at different locations of the vessel 102. If the flow characteristic of the vessel 102 is known, mixture detectors can be deployed at different locations in the vessel 102 to sample mixture volume at different locations, thus increasing the overall accuracy of the volume measurement. Here, two mixture volume detectors 112 are shown, but any number of mixture volume detectors 112, such as one, two, three, four, or any other number, may be used. Where a plurality of mixture volume detectors 112 is used, the individual mixture volume detectors 112 may be of different types among the types listed above.

A mixture volume detector that senses the location of phase boundaries can determine the volume of a mixture layer such as an emulsion or rag layer by using a table of volume at various elevations in the vessel 102. For example, the elevation of a first phase boundary, such as an emulsion-oil boundary, can be found by ultrasonic echolocation, and the elevation of a second phase boundary, such as an emulsion-water boundary, can also be found by ultrasonic echolocation. Corresponding volumes of the vessel 102 can be found from the vessel tank table, and a difference computed. The difference is representative of the volume of emulsion in the vessel 102.

The controller 114 determines a volume of the mixture in the vessel 102 based on the signal output by the mixture volume detector 112. The controller 114 is a digital processing system with at least a processor, memory, and storage or access to storage. The controller 114 receives the signal representing the volume of the mixture from the mixture volume detector 112. The signal may be a single value or a plurality of values and may include identification and/or location information. For example, in a case where the mixture volume detector 112 includes a plurality of sensors, each sensor may have an identification that can be sent to the controller 114 as part of the signal. Location information may include information referring to where on the vessel 102 the sensor is located. Alternately, the location information may be accessed from storage by the controller 114 based on identification information of the sensor.

In any event, the controller 114 determines volume of the mixture based on the signal received from the internal mixture volume detector 112. In one example, the signal received from the mixture volume detector 112 includes two elevation signals representing elevation of a top surface of the mixture volume and a bottom surface of the mixture volume. The signals may be echo times for ultrasonic signals emitted into the vessel 102, for example. Echo times may be converted to distances using measurements or tabulations of speed of sound in one or more media in the vessel 102. Measurements of speed of sound may be included in the signal received by the controller 114 from the mixture volume detector 112, or may be received separately from a sonic detector. The signal received by the controller 114 may include a value representing the speed of sound or a value representing the transmission time of a signal through the medium of interest. Parameter data for computing speed of sound or distance based on the speed of sound may be stored in the storage of, or accessible by, the controller 114. Such data may include tank table information that can be compared to elevation signals received from the mixture volume detector 112 to determine volume of a mixture in the vessel 102.

A spectral ultrasonic system can also be used to detect emulsion volume as well as other characteristics of the emulsion. An ultrasonic spectrum is broadcast into the fluid, and an echo response or transmitted spectrum, or both, is received. By comparing the received spectrum to the broadcast spectrum, a spectral signature can be obtained. The echo signature can be compared to model signatures to determine characteristics of the emulsion layer. Such detectors can be used along with other types of detectors to derive characteristics such as density and composition of the liquid mixture.

A chemical treatment apparatus 116 is coupled to the vessel 102 or the inlet 104. The chemical treatment apparatus 116 delivers chemical treatment that modifies the separation process performed in the vessel 102 based on the mixture in the vessel 102. The chemical treatment apparatus 116 may have a vessel feed line 118 and/or an inlet feed line 120. The vessel feed line 118 carries chemical treatment directly to the vessel 102 and may be coupled to the vessel 102 at any convenient location. The inlet feed line 120 is coupled to the inlet 104 of the vessel 102 to deliver chemical treatment to material flowing into the vessel 102 at the inlet 104. In one aspect, the chemical treatment may be, or may include, a demulsifier that reduces emulsion volume in the vessel. In another aspect, the chemical treatment may be, or may include, adjuvants such as dispersants, surfactants, solvents, flocculants, and the like to treat durable mixtures, and effects thereof, in the separator.

The controller 114 can determine an amount of chemical treatment to apply based on the volume of mixture determined from the signal received from the mixture volume detector 112. The determination may be based on a model of the mixture that predicts how the mixture responds to the chemical treatment. The model can take into account process parameters, environment parameters, and chemistry parameters of any chemicals in the chemical treatment. The model may take into account flow rates and vessel geometry to determine timing of the chemical treatment. The model may also take into account process parameters upstream of the vessel 102. The controller applies the amount of chemical emulsion treatment determined from the emulsion volume.

Figure 2:
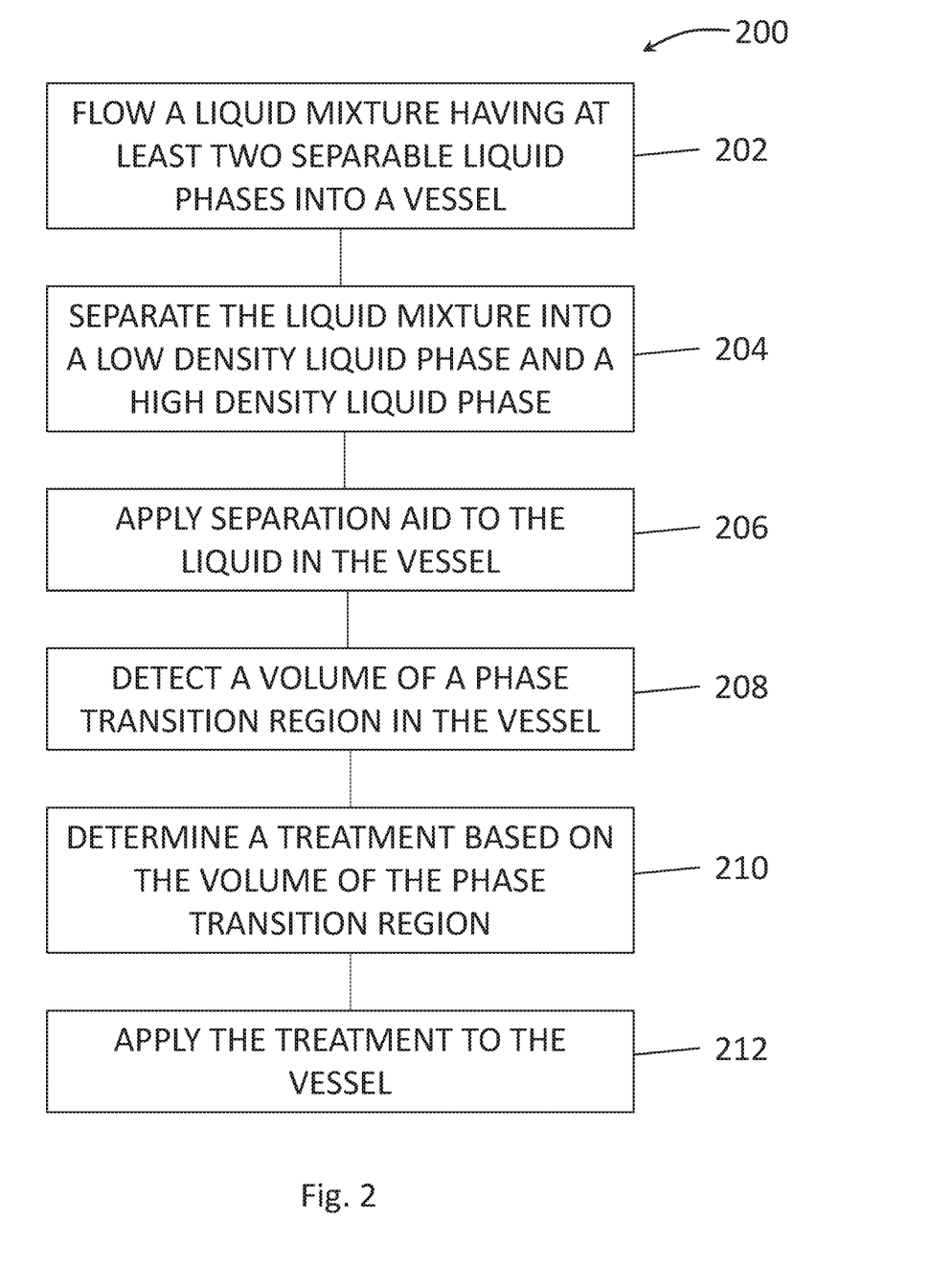
FIG. 2 is a flow diagram summarizing a method according to one embodiment.

FIG. 2 is a flow diagram summarizing a method 200 according to one embodiment. The method 200 is a method of operating a liquid separation apparatus, such as the apparatus 100 of FIG. 1. In the method 200 at 202, a liquid mixture having at least two separable liquid phases is flowed into a vessel. The liquid mixture may be flowed into the vessel from a bottom or lower portion of the vessel, a middle portion, or an upper portion of the vessel, depending on various factors including composition of the liquid mixture and features of the vessel. The liquid mixture may also be flowed into the vessel at multiple locations. At 204, the liquid mixture is allowed to separate substantially by gravitational coalescence into a low-density liquid phase and a high-density liquid phase, which are removed from the vessel as a low-density product and a high-density product, respectively.

At 206, separation aid is applied to the liquid in the vessel to enhance the gravitational separation. The separation aid may be electrical, chemical, sonic, or any combination thereof. In the case of chemical separation aids, a chemical treatment may be added to the liquid mixture prior to entering the vessel, or the chemical treatment may be added directly to the vessel through a dedicated portal. In some cases, mixers may be used to disperse the chemical treatment into the liquid mixture prior to flowing into the vessel. In other cases, dispersion apparatus, such as spargers, jet mixers, or other similar apparatus, may be disposed in the vessel to mix the chemical treatment into the vessel.

At 208, the volume of a phase transition region is detected. The phase transition region is a region of the vessel where a transition between the low-density liquid phase and the high-density liquid phase takes place. The phase transition region may have one or more interfaces between the two liquid phases, and may, in some cases, include a durable mixture region where, for example, emulsion or other durable multi-phase mixtures may be found. The multi-phase mixture may include the two separable liquid phases as well as solids. The volume of the phase transition region can be determined using an internal mixture volume detector or system, which can be, or include, a nuclear detector, an RF detector, an ultrasonic detector, a wave guided radar detector, a differential pressure detector, or a thermal detector.

The internal mixture volume detector may detect the elevation of boundaries in the phase transition region that can be used to determine the volume between the boundaries. The internal mixture volume detector may detect the elevation of boundaries at one or more locations in the vessel, since the elevation of the boundaries may change as liquids flow through the vessel and separation of the phases progresses. If the elevation of boundaries is detected at two or more locations, boundary elevation between the two or more locations can be assigned by interpolation to define a three-dimensional region whose volume can be calculated. Thus, the volume of the phase transition region between the two locations where boundaries are detected can be more precisely determined. An array of internal mixture volume detectors can be deployed at various locations in or on the vessel to determine local extent of the multi-phase mixture, and a model can be applied to determine mixture volume throughout the vessel from the detected local extents.

Specifically, a first mixture volume detector can output a signal representing a first local size of a detected multi-phase mixture at a first location in the vessel and a second mixture volume detector can output a signal representing a second local size of a detected multi-phase mixture at a second location in the vessel. An interpolation, or other mathematical model, can be applied to determine size of the multi-phase mixture at all locations between the first location and the second location. A third dimension can be used to expand the linear size from the model to a volume. For example, if the geometry of the vessel is known, for example the specific volume of the vessel as a function of location in the vessel, the first location and the second location can be compared to the vessel specific volume data to determine a volume of the multi-phase mixture between the first location and the second location. Alternately, a third size of the multi-phase liquid mixture can be determined at a third location to estimate a volume of the multi-phase mixture between the first, second, and third locations. In any event, a volume of a phase transition region is determined.

At 210, the volume of the phase transition region is related to the separation aids used in the vessel, and a treatment is determined based on the volume of the phase transition region. The volume can be related to the separation aids using a model that determines various separation aids as a function of mixture volume, and potentially as a function of environmental and process conditions such as temperature, pressure, flow rate, fractions of the liquid phases, and characteristics of the liquids such as composition, density, surface energy, viscosity, and the like. The volume can also be related to the separation aids using a model that predicts mixture volume based on separation aids and process and environment conditions. Both kinds of models can also be used together. At 212, the treatment is applied to the vessel by changing any of process conditions, for example flow rate of the feed stream, flow rate of any additional fluid added to the feed stream such as extra volume of one or more of the liquid phases in the feed stream, and condition of any separation aids such as electric power, flow rate of chemical treatments, and other applied energies.

Flow rate of the feed stream can be reduced, for example, to provide more time for settling and separation of phases. Alternately, if volume of the phase transition region is below a target, flow rate of the feed stream can be increased. Additional water can be added to improve separation of phases by diluting aqueous components, such as surfactants, that tend to stabilize emulsions. Thus, if volume of the phase transition region is above a target, adding water may reduce the volume. Emulsion stabilization forces are sensitive to temperature, so temperature of the process can be adjusted to change the volume of the phase transition region in some cases. In cases where separation is aided by application of an electric field, a characteristic of the electric field, such as frequency, amplitude, modulation, or wave form can be adjusted to change the volume of the phase transition region. For example, in some cases separation performance will respond to adjustments in base frequency or modulation frequency. Chemical treatments such as surfactants can also be adjusted to change separation performance. Typically, combinations of such parameter changes can be determined using a separation model.

In one case, a linear, or linearized, model M may be used to compute a flow rate of separation aids, as follows:

$$S=MD^T \quad (1)$$

where $D=\{V, p\}$, V is detected volume of multi-phase mixture, $p=\{p_1, p_2, p_3, \ldots, p_n\}$ is a vector of process conditions such as temperature, pressure, feed flow rate, fraction of first liquid in the feed stream, characteristics of the two liquids in the feed stream, solids in the feed stream, and potentially current conditions, such as flow rate energy, power, etc., of separation aids being applied to the vessel, among other potential parameters (superscript "T" denotes "transpose"), and M is a matrix of coefficients that when multiplied by the various parameters in the "detected" vector D yields a vector $S=\{S_1, S_2, S_3, \ldots, S_n\}$ of operating targets for separation aids.

The volume V and the parameters p can be updated at the same time, or at different times, and the model can then be applied to the new detected vector D to update the operating targets S. The new operating targets can be filtered, if desired, prior to applying to flow controls for the separation aids. For example, a change tolerance Σ can be applied so that a new operating target $S_i$ is applied only if $\Delta S_i > \Sigma_i$, where $\Delta S_i$ is the change in the value of the operating target $S_i$ from applying the new detected vector D. The entire new operating target vector can be applied in the event that only one operating target changes enough to exceed its tolerance. In other words, if there is an operating target vector with a first operating target and a second operating target, and applying a new detected vector results in a change to the first operating target and a change to the second operating target, if the change in the first operating target is larger than a change tolerance for the first operating target, the first operating target alone can be updated, or both the first and second operating targets can be updated. Instead of being an absolute model of the process, the model can be an incremental model of the process, a linear model that returns change in operating targets from change in detected values. In this case, the detected vector can be a change in any detected parameter that, when multiplied by a set of coefficients, gives a change in operating targets for separation aids. The detected vector can also be a mixture of absolute values and change values. Limits can also be applied to the operating target changes, if desired.

Weighting factors may be applied to the model, or the model may include weighting factors that are applied to influence the results returned by the model. The weighting factors may be applied using a rank-4 tensor, as follows:

$$S = WMD^T$$

where W is the rank-4 tensor of weighting factors that, when tensor-multiplied by the model matrix M yields an adjusted model matrix M', where M'=WM is a matrix. Alternately, W can be a rank-2 tensor that is applied element-by-element according to the Hadamard product:

$$S = W \cdot MD^T.$$

The weighting factors may include information about reliability of data, time delay, or other circumstances not directly reflected in the model itself but potentially useful from time-to-time in tuning the results of the model.

The method 200 enables closed-loop control of separator performance as conditions change that affect the efficiency of the separation process. If the mixture volume detection system detects an increasing volume of durable multi-phase mixture in the vessel, a controller can apply the model, get a result, and apply the result to mitigate the increase. Likewise, if the mixture volume detection system detects a decreasing volume of durable multi-phase mixture in the vessel, the controller can apply the model, get a result, and apply the result to improve efficiency of the separation process by applying less separation aid or by increasing throughput.

It should be noted that the methods described herein can be used to adjust not only flow rates of separation aids in response to volume of a durable multi-phase liquid mixture, but other process parameters as well. Temperature, pressure, and process flow rates can also be adjusted to affect volume of the durable multi-phase liquid mixture, as determined by the modeling methods described herein. It should also be noted that the detected vector D can be time-adjusted to compensate for dead times in the process. For example, if a change is made to flow rates of chemical treatments, and a volume reading is taken before the chemical treatments could have taken full effect, the change in flow rate of the chemical treatments can be discounted, or neglected altogether, in comparison to the volume reading.

The inverse problem can also be addressed. If the parameters p change, the model M above can be used to calculate what should happen to the liquid mixture volume V. If we expand equation (1) into components, we have $$S_1 = (M_{11}D_1 + M_{12}D_2 + \ldots + M_{1n}D_n)$$

$$S_2 = (M_{21}D_1 + M_{22}D_2 + \ldots + M_{2n}D_n)$$

and so on. Volume V is one of the D components, for example $D_1$. So, $$S_i = (M_{i1}V + M_{i2}D_2 + \ldots + M_{in}D_n) = M_{i1}V + B_i p$$

where p is the parameter vector defined above and $B_i$ is the stub of row i of M without the first coefficient $M_{i1}$ that multiplies the liquid mixture volume. Thus, we have $$V_i = \frac{1}{M_{i1}} S_i - \frac{1}{M_{i1}} B_i p.$$

The reverse model thus decomposes into a function of the operating target and the process parameters where the coefficients are derived from the original model. We can compute this result using each operating target and each row of M to get a series of values for liquid mixture volume that we can compare to a new measured value of liquid mixture volume. Deviation of the calculated value from the measured value indicates an error in the coefficients used to compute the calculated value. The model coefficients (components of M) can be systematically varied, and the effect on the computed error assessed, to improve the model. Note that this can apply to the modeled effect of separation aids as well as process parameters such as temperature, pressure, and process flow rate.

Figure 3:
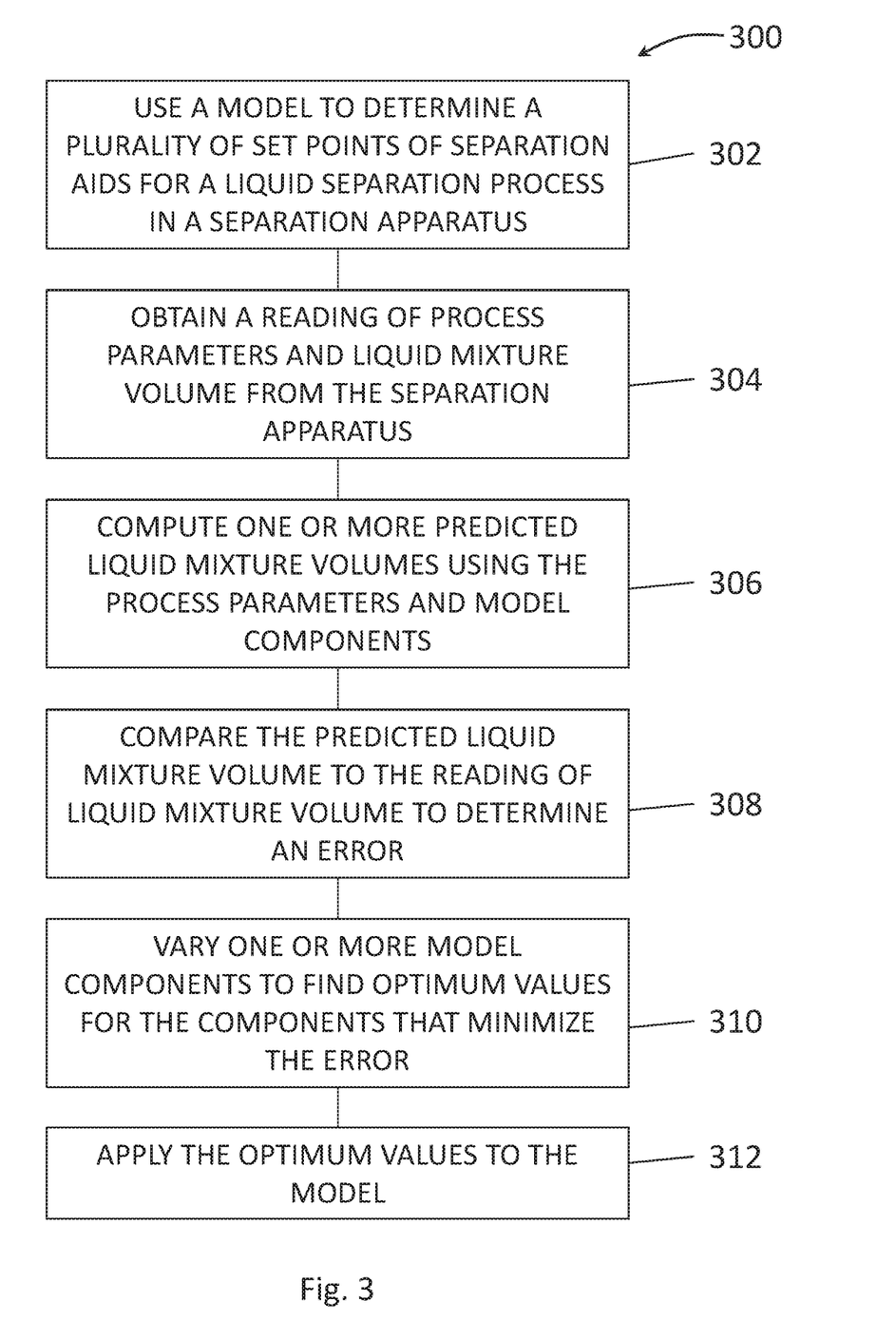
FIG. 3 is a flow diagram summarizing a method according to another embodiment.

FIG. 3 is a flow diagram summarizing a method 300 according to another embodiment. The method 300 incorporates elements of the method 200 with model correction elements described above. Thus, the method 300 is a method of operating a separation apparatus similar to the apparatus 100 of FIG. 1. At 302, a model is used to determine a collection of operating targets of separation aids substantially as described in connection with the method 200.

At 304, a reading of process parameters of the separation apparatus is obtained and a reading of liquid mixture volume in the separation apparatus is also obtained. At 306, the reading of process parameters is used, along with components of the model, to compute one or more predicted liquid mixture volumes. At 308, each predicted liquid mixture volume is compared with the reading of liquid mixture volume to compute an error, which corresponds to the components of the model used to compute the predicted liquid mixture volume. At 310, the components of the model used to compute each predicted liquid mixture volume are systematically varied to minimize the corresponding error between predicted and actual liquid mixture volume and to yield optimized model components. Any optimization algorithm can be used to seek minimized error. At 312, the model components are replaced with the optimized model components.

The method 300 can be used along with the method 200 in a cycled manner. The method 300 is generally used to update the model components with new model components as the process evolves. For example, the method 200 can be used a predetermined number of times, and then the method 300 can be used to check model validity and update model components. The predetermined number of times may be any convenient number, such as 5, 10, or 50.

Figure 4:
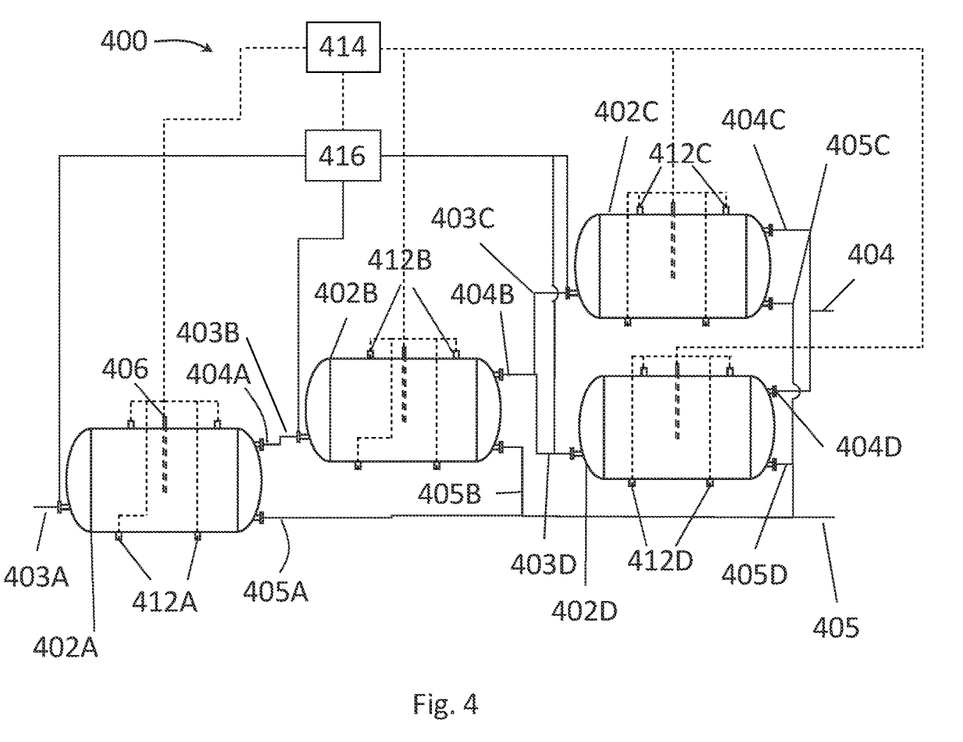
FIG. 4 is a process view of a separation system according to another embodiment.

FIG. 4 is a process view of a separation system 400 according to another embodiment. The separation system 400 includes at least two separators 402. In this case, the separation system 400 has four separators 402A, 402B, 402C, and 402D arranged in a series flow relationship. That is, a low-density effluent of separator 402A is routed to separator 402B, an effluent of separator 402B is routed to separator 402C, and an effluent of separator 402C is routed to separator 402D. Each of the separators 402 separates separable liquid phases of a feed stream 403 into a low-density product 404 and a high-density product 405. Thus, the separator 402A separates a feed stream 403A into a low-density product 404A and a high-density product 405A. The low-density product 404A is here routed to the feed stream 403B of separator 402B, and the low-density product 404B is routed to the feed 403C of separator 402C and the feed 403D of separator 402D. Thus, the separator 402A is in series with the separator 402B, which is in series with the pair of separators 402C and 402D, which are in parallel. This is an example configuration, and any desired configuration of separators may be used. In this case, the separation system 400 ultimately produces four high-density product streams 405A, B, C, D, and two low-density product streams 404C and 404D. Here, the four high-density product streams 405A-D are combined into one high-density product stream 405, and the two low-density product streams 404C and D are combined into one low-density product stream 404. The separation system 400 illustrates one way of arranging a plurality of liquid phase separators. Any combination of connecting low and high-density product streams to downstream separators can be used. Additionally, parallel flow elements can be used, for example by adding additional feed streams to, for example, any or all of the feed streams 403B, 403C, or 403D.

One or more of the separators 402A, B, C, or D can have separation accelerators as described in connection with the separator 100 of FIG. 1. One or more of the separators 402A, B, C, or D can also have liquid mixture volume detectors. In this case, each of the separators 402A, B, C, and D has a separation accelerator 406 (only one is labelled for clarity of the figure). Electric power is coupled to each of the separation accelerators 406 according to any convenient pattern, for example A/C power, D/C power, modulated A/C power, or modulated D/C power, or any combination thereof. In one case, the separator 402A is a dehydrator, the separator 402B is a second dehydrator, the separator 402C is a desalter, and the separator 402D is a second desalter.

Each of the separators 402A, 402B, 402C, and 402D has an internal mixture volume detector 412 (respectively 412A, 412B, 412C, and 412D) that detects a volume of a phase transition region in the respective separator. Here, each of the separators 402A, 402B, 402C, and 402D has four internal mixture volume detectors 412, although only two detectors of each separator are labelled for clarity of the figure. A chemical treatment apparatus 416 is coupled to the separators 402. As in the apparatus 100 of FIG. 1, the chemical treatment apparatus 416 includes equipment to deliver one or more chemical treatments to the separators 402. The equipment generally includes storage and delivery hardware to flow the one or more chemical treatments to the separators 402, specifically in this case the inlet for each feed stream 403. The chemical treatments can be substances that aid settling of the mixed liquid phases in the feed stream 403.

A controller 414 is coupled to the separators 402 and the chemical treatment apparatus 416. The controller 414 is configured to receive signals from the internal mixture volume detectors 412, and to send and receive signals to and from the chemical treatment apparatus 416. The controller 414 can also be configured to send and receive signals to and from other control elements of the separators 402, such as the separation accelerators 406 and flow control elements controlling flow rate of the inlet streams 403 and the outlet streams 404 and 405.

The controller 414 is configured to control liquid mixture volume in the separators 402 for best separation results. The controller 414 may be given an operating target for liquid mixture volume in each of the separators, or in a subset of the separators, for example one separator. The internal liquid mixture volume detectors 412 send signals to the controller 414 representing volume of liquid mixture detected inside the separators. The controller 414 then controls any or all of flow rate of feed streams 403A-D, flow rate of low-density product streams 404A-D, flow rate of high-density product streams 405A-D, operating characteristics of any or all of the separation accelerators 406, such as voltage or voltage pattern, flow rate of chemical treatments from the chemical treatment apparatus 416 to any or all of the separators 402A-D, temperature and/or pressure of any or all of the separators 402A-D, and auxiliary fluid flow to any or all of the separators 402. Auxiliary fluids, such as water, can be provided to any or all of the separators 402 to help in removing components extractable into the auxiliary fluid.

A model may be used by the controller 414 to control liquid mixture volume in the separators 402. The model can be a collection of models of the individual separators 402, similar to the model described above, or the model can be an ensemble model of all the separators 402 together. The model can be used in a manner similar to the model described above to resolve operating targets for the various controlled parameters of the system 400. It should be noted that, in this case, internal liquid mixture volume in an individual separator can be both a controlled element and a manipulated element. Additionally, internal liquid mixture volume at a certain location, a certain detector, can be both a controlled element and a manipulated element. For example, as part of overall control of the system 400, the controller may change the operating target for internal liquid mixture volume at one detector 412 in order to optimize the overall operation of the system. The controller 414 may raise and lower operating targets for internal liquid mixture volume at all the detectors 412 to achieve an overall objective, for example quantity of low-density fluid in the high-density fluid product 405, or quantity of high-density fluid in the low-density fluid product 404. The controller 414 may also anticipate effects of changes in upstream processes on the objective and make proactive adjustments to internal liquid mixture volume operating targets to compensate.

The model used by the controller may include coefficients and/or functions to resolve the effect of process parameters such as temperature, pressure, and process flow rate to predict the effect that a change in any such parameter will have on the volume of durable multi-phase fluid mixture.

The model will also include coefficients and/or functions to resolve the effect of adding separation aids and auxiliary fluids such as water to the separator. As noted above, the model can be used to determine a new operating target for any process parameter or flow rate in response to a change in volume of durable multi-phase fluid (the "forward" problem), or the model can be used to predict the effect on volume of durable multi-phase fluid from any given change (the "reverse" problem).

The liquid mixtures described herein may be oil/water mixtures, where the oil and water are obtained from hydrocarbon reservoirs. The water can be added to the oil below ground, and the two liquids surfaced together, or the water can be added to the oil after surfacing. Other separable liquid mixtures can also be treated using methods and apparatus described hereon. The chemical treatment apparatus described herein can include various sources of demulsifiers, surfactants, anti-foam agents, desalting agents, and the like. The separation accelerators described herein can be electrical, thermal, acoustic, or any combination thereof. Electrical accelerators can be D/C or A/C, and may be modulated or varied according to any desired pattern. For example, an A/D electrical setting accelerator may apply a time-varying voltage to an electrode to accelerate setting. The time-varying voltage may vary according to any or all of amplitude, frequency, waveform, modulation amplitude, modulation frequency, modulation waveform, and duty cycle. All these variables can affect formation and mitigation of durable multi-phase liquid mixtures inside a separator as described herein. Coupling the internal liquid mixture volume detectors to a controller enables direct manipulation of the variables that impact volume of liquid mixtures.

While the foregoing is directed to embodiments of the subject matter of this disclosure, other and further embodiments of the present disclosure may be devised without departing from the basic scope thereof, and the scope thereof is determined by the claims that follow.

What is claimed is:

1. A multi-phase liquid separation control system, comprising:
   an internal liquid mixture volume measurement device comprising a nuclear detector, an RF detector, an ultrasonic detector, a wave guided radar detector, a differential pressure detector, a spectral acoustic detector, or a thermal detector, or a combination thereof;
   a chemical treatment system comprising a demulsifier source;
   a controller coupled to the internal liquid mixture volume measurement device and the chemical treatment system and configured to:
      receive a signal from the internal liquid mixture volume measurement device representing a measured volume of a liquid mixture;
      define an error between a predicted volume and the measured volume of the liquid mixture based on the signal and an operating parameter of the system using a model comprising one or more adjustable components;
      minimize the error by varying one or more of the one or more adjustable components of the model; and
      control a demulsifier addition rate from the demulsifier source based on the signal and the error; and
   a separation accelerator operatively coupled to the controller and configured to:
      receive operating signals from the controller; and
      apply a time-varying voltage to an electrode such that setting of the internal liquid mixture is accelerated.

2. The multi-phase separation control system of claim 1, further comprising a plurality of internal liquid mixture volume measurement devices and a plurality of separation accelerators.

3. A separator, comprising:
   a vessel;
   an internal liquid mixture volume measurement device coupled to the vessel, the internal liquid mixture volume measurement device comprising a nuclear detector, an RF detector, an ultrasonic detector, a wave guided radar detector, a differential pressure detector, a spectral acoustic detector, or a thermal detector, or a combination thereof;
   a chemical treatment apparatus coupled to the vessel, the chemical treatment apparatus comprising a demulsifier source;
   a controller coupled to the internal liquid mixture volume measurement device and the chemical treatment apparatus and configured to:
      receive a signal from the internal liquid mixture volume measurement device representing a measured volume of a separable liquids mixture in the vessel;
      define an error between a predicted volume and the measured volume of the liquid mixture based on the signal and an operating parameter of the separator using a model comprising one or more adjustable components;
      minimize the error by varying one or more of the one or more adjustable components of the model; and
      control a rate of demulsifier addition to the vessel based on the signal and the error; and
   a separation accelerator operatively coupled to the controller and configured to:
      receive operating signals from the controller; and
      apply a time-varying voltage to an electrode such that setting of the internal liquid mixture is accelerated.

4. The separator of claim 3, further comprising a plurality of internal liquid mixture volume measurement devices, each coupled to the controller, the controller configured to receive signals from each of the internal liquid mixture volume measurement devices representing a measured volume of a separable liquids mixture in the vessel at a location of the respective internal liquid mixture volume measurement device in the vessel.

5. The separator of claim 3, wherein the operating parameter is a flow rate of chemical treatment added to the vessel.

6. The separator of claim 5, wherein the vessel is a first vessel, the internal liquid mixture volume measurement device is a first internal liquid volume measurement device, and the signal is a first signal, and further comprising a second vessel fluidly coupled to the first vessel and to the chemical treatment apparatus, the second vessel having a second internal liquid mixture volume measurement device, and the controller is further configured to receive a second signal from the second internal liquid mixture volume measurement device, and to control a plurality of operating parameters of the separator based on the first signal and the second signal.

7. A method, comprising:
   detecting a volume of a multi-phase liquid mixture inside an operating liquids separator using one or more detectors;
   determining, from a signal of the one or more detectors, the volume of the multi-phase liquid mixture;
   defining an error between a predicted volume and the volume of the multi-phase liquid mixture based on the signal of the one or more detectors and an operating parameter of the separator using a model comprising one or more adjustable components;

minimizing the error by varying one or more of the one or more adjustable components of the model;

determining a target rate of demulsifier addition to the separator based on the volume of the multi-phase liquid mixture and the error;

determining a time-varying voltage to be applied to an electrode to accelerate a setting of the volume of the multi-phase liquid mixture; and applying the target rate of the demulsifier addition to the separator and the time-varying voltage.

8. The method of claim 7, further comprising applying energy to the multi-phase liquid mixture, wherein the target rate of the demulsifier addition includes a target of the energy.

9. The method of claim 7, further comprising using machine learning to update the model.

\* \* \* \* \*